US012037230B2

(12) United States Patent
Rosencrance et al.

(10) Patent No.: US 12,037,230 B2
(45) Date of Patent: Jul. 16, 2024

(54) FOLDABLE RAIL ASSEMBLY

(71) Applicant: Oshkosh Corporation, Oshkosh, WI (US)

(72) Inventors: Devin Rosencrance, Oshkosh, WI (US); David Hoover, Oshkosh, WI (US); Dorothy Greenberger, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 912 days.

(21) Appl. No.: 17/090,267

(22) Filed: Nov. 5, 2020

(65) Prior Publication Data

US 2021/0139303 A1 May 13, 2021

Related U.S. Application Data

(60) Provisional application No. 62/932,171, filed on Nov. 7, 2019.

(51) Int. Cl.
*B66F 17/00* (2006.01)
*B66F 11/04* (2006.01)

(52) U.S. Cl.
CPC .......... *B66F 17/006* (2013.01); *B66F 11/042* (2013.01); *B66F 2700/09* (2013.01)

(58) Field of Classification Search
CPC .. B66F 17/006; B66F 11/042; B66F 2700/09; E04G 1/34; E04G 5/14; E04G 5/142; E04G 21/3228
See application file for complete search history.

(56) References Cited

U.S. PATENT DOCUMENTS 6,145,619 A * 11/2000 Risser .................. B66F 11/044 182/2.1
7,896,606 B2 3/2011 Ethington et al.
8,206,052 B1 * 6/2012 Hayman ................ E04G 7/307 403/321
8,813,981 B2 8/2014 Ethington
9,033,165 B2 5/2015 Aus et al.
9,139,409 B2 9/2015 Perron
9,938,121 B2 4/2018 Aus et al.
10,221,048 B2 3/2019 Aus et al.
(Continued)

FOREIGN PATENT DOCUMENTS

AU 2021275442 A1 * 2/2023 ............ B29C 45/14
CA 3043390 A1 * 11/2019 ............. B66F 11/04
(Continued)

OTHER PUBLICATIONS

Foreign Search Report on PCT PCT/US2020/059087, dated Feb. 26, 2021, 19 pps.

*Primary Examiner* — Daniel P Cahn
*Assistant Examiner* — Steven D Yates
(74) *Attorney, Agent, or Firm* — Foley & Lardner LLP

(57) ABSTRACT

A foldable rail assembly is coupled to a platform and includes vertical rails and a rectangular rail structure that is hingedly coupled to the vertical rails. The rectangular rail structure is rotatable about hinged couplings formed between the rectangular rail structure and the vertical rails, and movable between a first, deployed position and a second, folded position. The rectangular rail structure extends upwardly from the platform higher in the first position than in the second position.

17 Claims, 15 Drawing Sheets

(56) References Cited

U.S. PATENT DOCUMENTS

| | | | | |
|---|---|---|---|---|
| 10,730,729 | B1 * | 8/2020 | Cui | E04G 1/34 |
| 2004/0238278 | A1 * | 12/2004 | Gibson | E06C 1/393 182/129 |
| 2004/0238280 | A1 * | 12/2004 | Gibson | E06C 1/393 182/153 |
| 2006/0278472 | A1 * | 12/2006 | Kenton | E04G 21/3238 182/113 |
| 2009/0232606 | A1 * | 9/2009 | Penza | E04G 13/02 405/257 |
| 2017/0101297 | A1 * | 4/2017 | Claypool | B60M 1/28 |
| 2018/0044986 | A1 * | 2/2018 | Cook | B64F 5/00 |
| 2018/0163471 | A1 * | 6/2018 | Lentine | E06C 7/50 |
| 2019/0330864 | A1 * | 10/2019 | Curtis | E04G 5/001 |
| 2020/0290852 | A1 | 9/2020 | Rosencrance | |
| 2020/0290853 | A1 | 9/2020 | Neubauer et al. | |
| 2020/0290855 | A1 | 9/2020 | Bruno et al. | |
| 2020/0317256 | A1 | 10/2020 | Hao et al. | |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0348764 | A1 | 11/2020 | Clifton et al. | |
| 2020/0398670 | A1 | 12/2020 | Rocholl et al. | |
| 2020/0398695 | A1 | 12/2020 | Rocholl et al. | |
| 2020/0398697 | A1 | 12/2020 | Rocholl et al. | |
| 2020/0399057 | A1 | 12/2020 | Rocholl et al. | |
| 2021/0031611 | A1 | 2/2021 | Yakes et al. | |
| 2021/0031612 | A1 | 2/2021 | Yakes et al. | |
| 2021/0254351 | A1 * | 8/2021 | Tubbs | E04G 5/14 |
| 2021/0355695 | A1 * | 11/2021 | Lyras | E04F 11/1865 |
| 2022/0098928 | A1 * | 3/2022 | Zaifman | A47C 12/02 |
| 2022/0145700 | A1 * | 5/2022 | Major | E06C 7/50 |
| 2022/0282501 | A1 * | 9/2022 | Chen | E04G 1/34 |
| 2022/0371868 | A1 * | 11/2022 | Barlow | B66F 17/006 |

FOREIGN PATENT DOCUMENTS

| | | | | |
|---|---|---|---|---|
| CN | 202785543 | | | 3/2013 |
| CN | 114634138 | A | * | 6/2022 |
| CN | 114655901 | A | * | 6/2022 |
| CN | 115448228 | A | * | 12/2022 |
| CN | 115465822 | A | * | 12/2022 |
| FR | 2929304 | | | 10/2009 |
| JP | S57-126400 | A | | 8/1982 |
| KR | 101123630 | B1 | | 3/2012 |
| KR | 101302226 | B1 | | 9/2013 |
| KR | 2015/0124626 | | | 11/2015 |
| KR | 20150124626 | A | | 7/2016 |

* cited by examiner

FOLDABLE RAIL ASSEMBLY

CROSS-REFERENCE TO RELATED APPLICATION

This application claims priority to U.S. Provisional Patent Application No. 62/932,171, filed Nov. 7, 2019, the content of which is hereby incorporated by reference in its entirety.

BACKGROUND

Scissor lifts and other mobile elevating work platforms (MEWPs) typically include a height-adjustable platform surrounded by safety railing. Industry standards specify that safety railing should extend upward from the platform to a threshold height to protect workers on the platform. The combined height of the safety railing, the platform, foldable scissors, and a vehicle chassis may be greater than the height of a standard doorway, which can prevent the scissor lift from entering into a building or into a desired room within a building without significant and time consuming modifications to either the scissor lift or the doorway.

SUMMARY

One exemplary embodiment relates to a foldable rail assembly. The foldable rail assembly is coupled to a platform and includes a support structure having at least two sets of vertical rails that support a rectangular rail structure. The rectangular rail structure is rotatably coupled to the vertical rails using one or more rotary latches. The rectangular rail structure is rotatable about hinged couplings formed between the rectangular rail structure and the vertical rails, and movable between a first position and a second position. An uppermost surface of the rectangular rail surface is positioned closer to the platform in the second position than in the first position, such that the rectangular rail structure is shorter in the second position than the first.

Another exemplary embodiment relates to a scissor lift platform. The scissor lift platform includes a rectangular platform base and a foldable rail assembly coupled to the rectangular platform base. The foldable rail assembly extends upwardly from a perimeter of the rectangular platform base to define a passenger compartment. The foldable rail assembly includes a rectangular rail structure positioned away from the rectangular platform base and is rotatably coupled to a support structure of vertical rails extending away from the rectangular platform base. The rectangular rail structure is movable between a first position where the rectangular rail structure is aligned with the rectangular platform base and positioned at a first distance away from the rectangular platform base to a second position where the rectangular rail structure is offset from the rectangular platform base and is positioned at a second distance away from the rectangular platform base that is smaller than the first distance.

Another exemplary embodiment relates to a scissor lift. The scissor lift includes a base, a plurality of foldable support members, a platform, and an actuator. The plurality of foldable support members are rotatably coupled to one another about pins and form a retractable lifting mechanism. A lowermost group of the plurality of foldable support members are rotatably coupled to the base. The platform is coupled to and supported by an uppermost group of the plurality of foldable support members. The platform has a foldable rail assembly coupled to the platform that extends upwardly from a perimeter of the platform to define a passenger compartment. The foldable rail assembly includes a rail structure positioned away from the platform that is rotatably coupled to vertical rails extending away from the platform. The rail structure is movable between a first position where the rail structure is aligned with the platform and positioned at a first distance away from the platform to a second position where the rail structure is offset from the platform and is positioned at a second distance away from the platform that is smaller than the first distance. An actuator is pivotally coupled to at least one of the foldable support members, and is movable between a stowed position and an extended, deployed position. The actuator engages and forces the plurality of foldable support members away from the base to lift the platform away from the base in the deployed position.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to foldable rail assemblies for use upon a mobile elevating work platform (MEWP), such as a scissor lift. The foldable rail assemblies are supported by a platform of the scissor lift and are movable between a first, deployed position and a second, stowed position about latches positioned on each side of the foldable rail assembly. In the deployed position, the foldable rail assembly extends away from the platform to a threshold height (e.g., at least 1.1 meters) recommended by industry standards, such as ANSI 92.20. Unlocking and disengaging the latches of the foldable rail assembly allows the foldable rail assembly to fold downward, to the stowed position. In the stowed position, the height of the foldable rail assembly and the overall height of the MEWP are reduced to be less than the height of a standard doorway (e.g., ~2 meters). By folding the foldable rail assembly downward into the stowed position, the MEWP can travel through a standard doorway without major modifications to either the doorway or the MEWP. Once the MEWP has traveled to a desired location, the foldable rail assembly can be re-deployed and secured into the first position so that an operator can begin performing tasks atop the platform. The rotary latches incorporated into the foldable rail assembly enable a fast and efficient folding and unfolding process for the rail assembly that can be completed without the use of tools, without the removal of pins or other structural components from the MEWP or a doorway, and without other disassembly processes that may be time consuming or difficult to perform.

Figure 1:
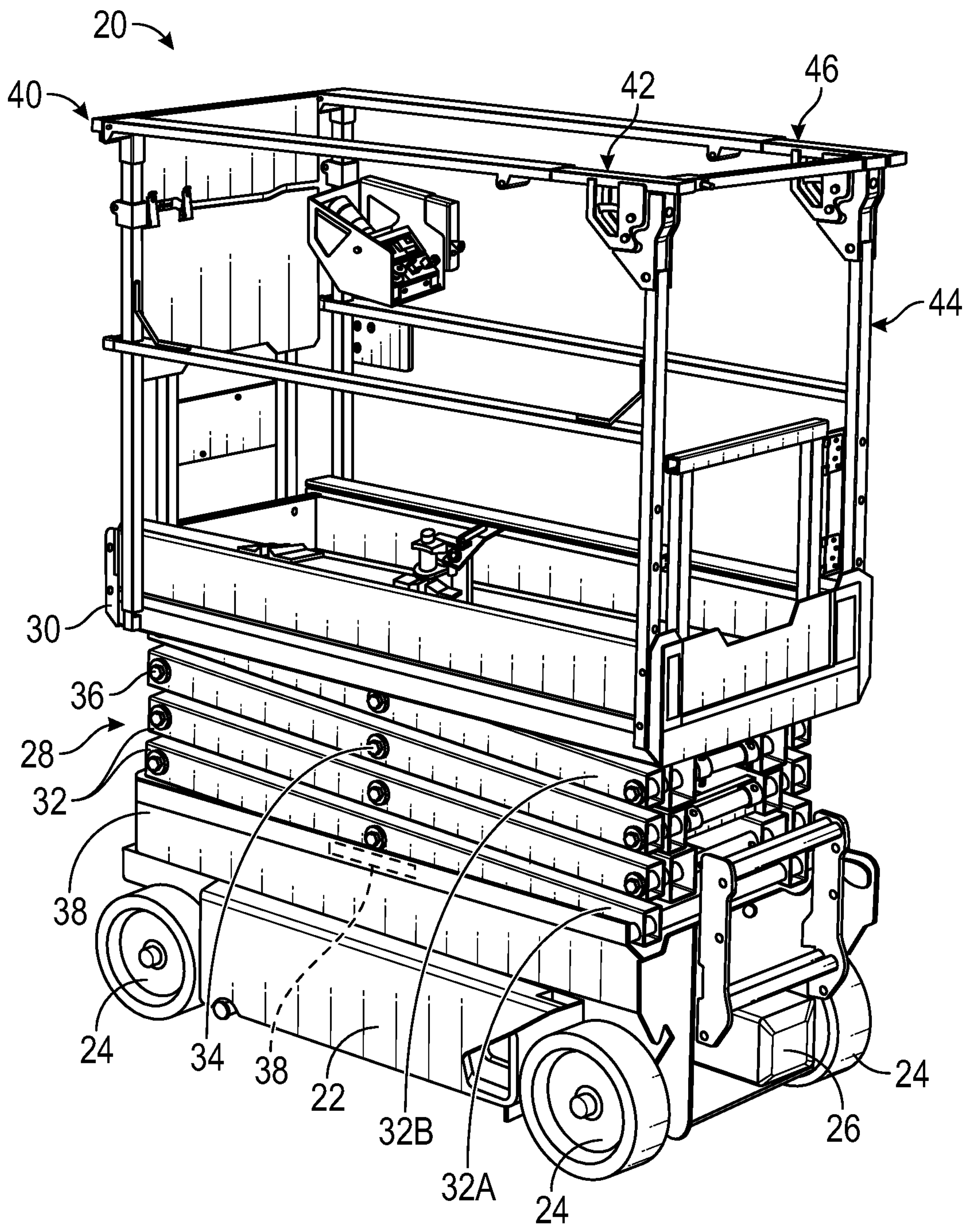
FIG. 1 is a perspective view of a scissor lift, according to an exemplary embodiment.
Figure 2:
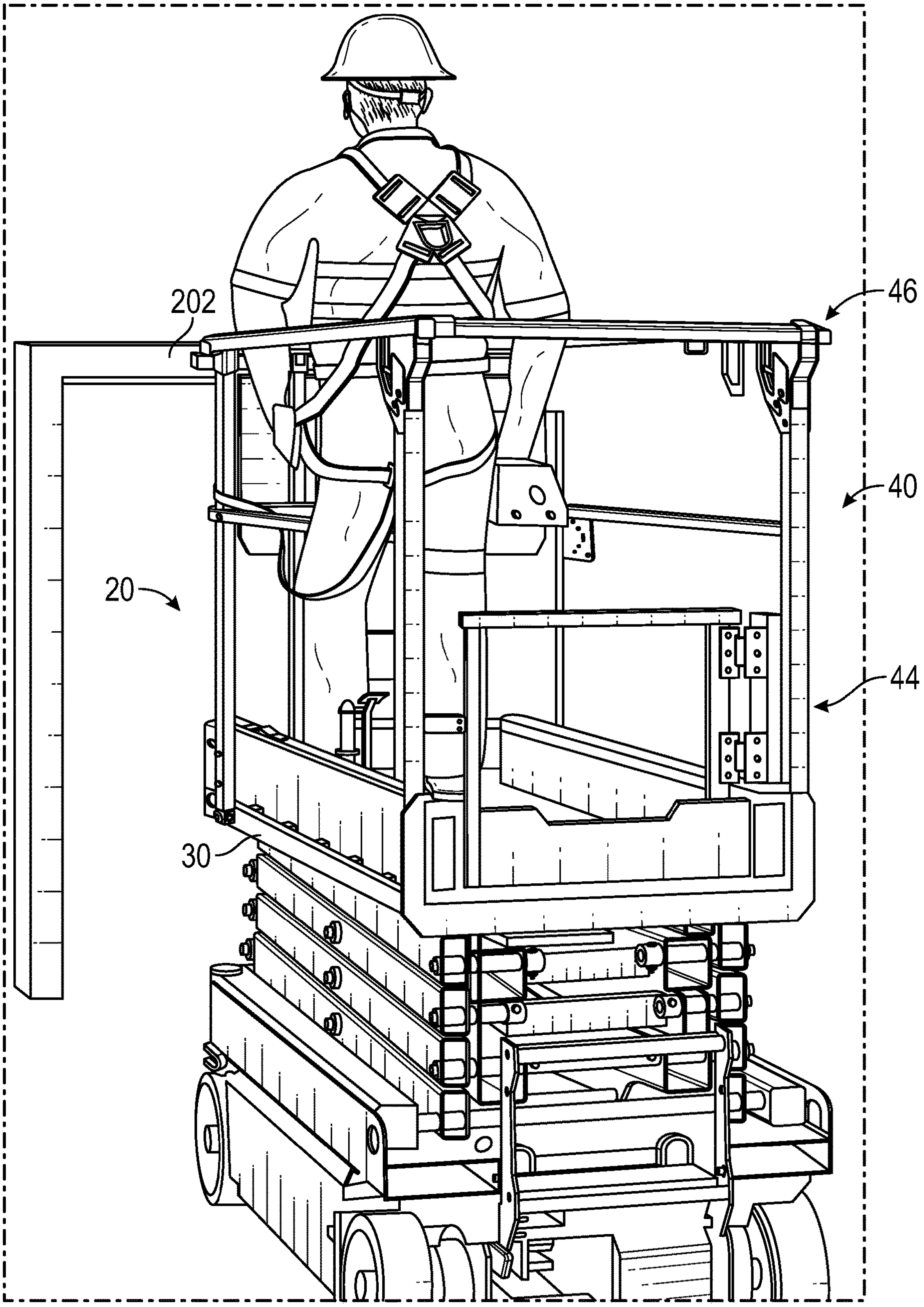
FIG. 2 is a perspective view of the scissor lift of FIG. 1, shown approaching a standard doorway in a configuration taller than a height of the standard doorway.

Referring to FIGS. 1 and 2, a MEWP 20 is shown. The MEWP 20 can be a scissor lift or boom lift, for example, which can be used to perform a variety of different tasks at various heights relative to the ground below. The MEWP 20 includes a base 22 supported by wheels 24 positioned about the base 12. The wheels 24 can be driven by a motor 26 (e.g., an electric motor, a hydraulic motor, an engine, etc.) directly or through a transmission to propel the MEWP 20 to a desired location for completing a task.

A retractable lifting mechanism 28 is coupled to the base 22 of the MEWP 20 and supports a platform 30. The retractable lifting mechanism 28 is a scissor lift structure formed of a series of linked, foldable support members 32 connected to one another using central pivot pins 34 and outer pivot pins 36. The central pivot pins 34 and outer pivot pins 36 extend through adjacent support members 32 to pivotally couple the support members 32 in an assembly. The support members 32 include lowermost foldable support members 32A pivotally coupled to the base 22 and uppermost foldable support members 32B pivotally coupled to an underside of the platform 30. Adjusting the angular relationships between adjacent support members 32, 32A, 32B pivots the lowermost foldable support members 32A and other support members 32, 32B away from the base 22 and away from one another, which alters the position of the platform 30 relative to the base 22 so that tasks can be accomplished at different heights. The foldable support members 32 of the retractable lifting mechanism 28 are folded or unfolded using an actuator 38, such as a hydraulic cylinder, pneumatic cylinder, or electric linear actuator, for example. The actuator 38 controls the position of the retractable lifting mechanism 28 and platform 30 by selectively applying force to the lifting mechanism 28, which occurs by changing a length of the actuator 38.

Figure 3A:
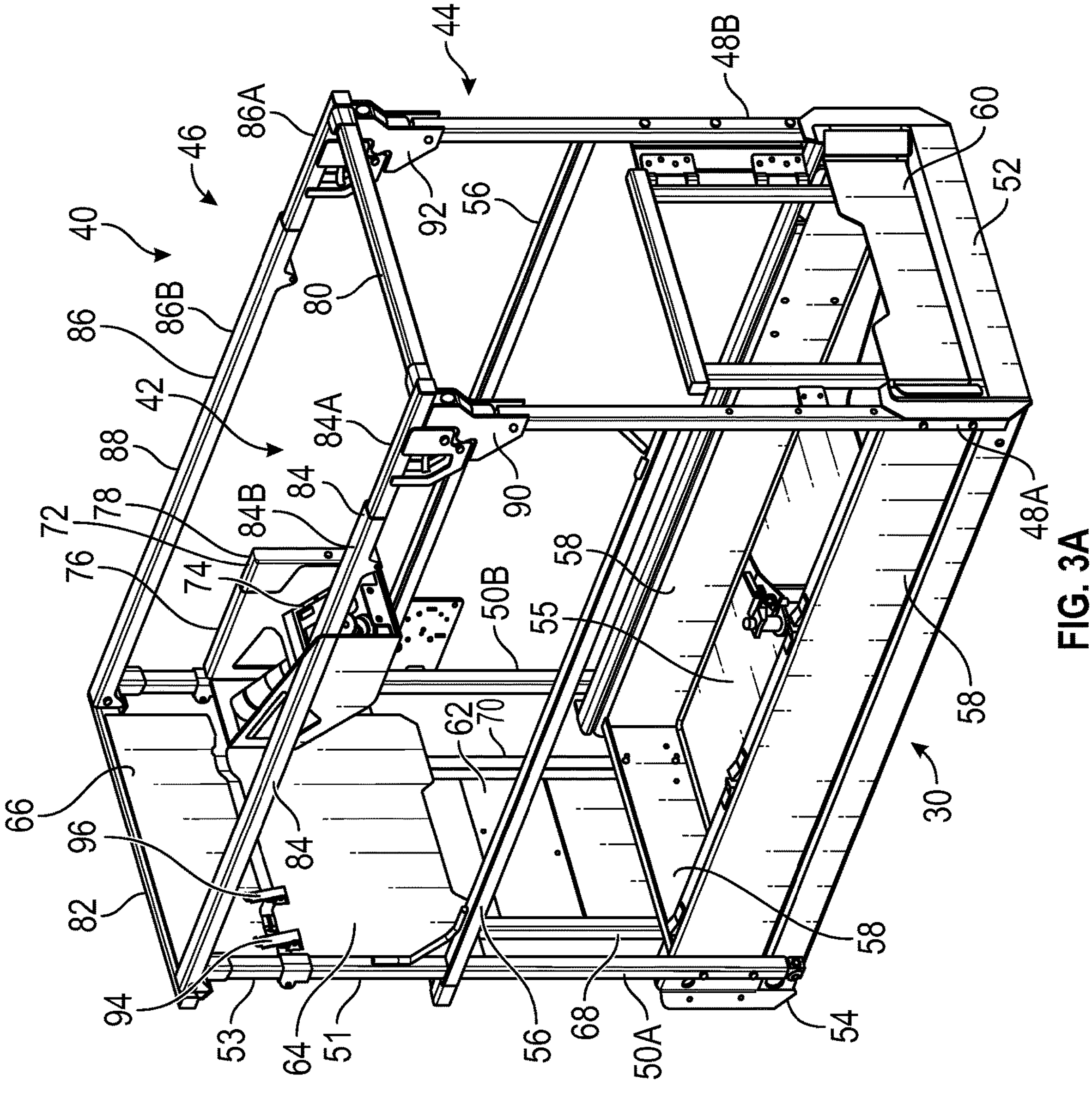
FIG. 3A is a perspective view of a foldable rail assembly of the scissor lift of FIG. 1, shown in a first, deployed position.
Figure 3B:
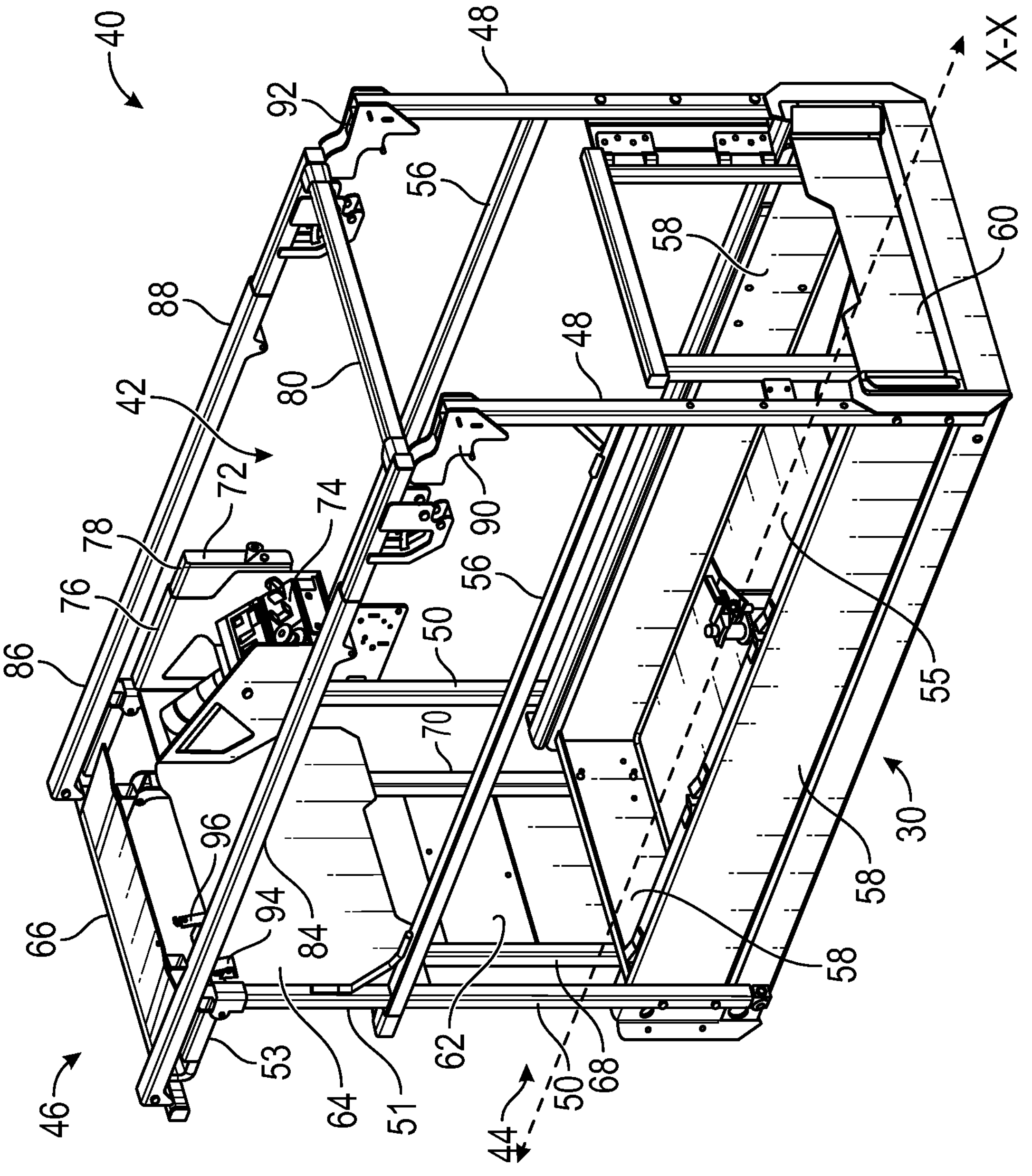
FIG. 3B is a perspective view of the foldable rail assembly of FIG. 3A, shown in a second, stowed position.

With additional reference to FIGS. 3A and 3B, a foldable rail assembly 40 is coupled to and extends away from the platform 30. The platform 30 is defined by a generally rectangular shape, and the foldable rail assembly 40 surrounds at least a portion of the platform 30 to define a passenger compartment 42 upon the platform 30. In some examples, the foldable rail assembly 40 extends upwardly from an outer perimeter of the platform 30. The foldable rail assembly 40 can move between a deployed position and a folded, stowed position to help transport the MEWP 20.

The foldable rail assembly 40 generally includes a lower rigid support structure 44 and an upper rectangular rail structure 46 pivotally coupled to the support structure 44. In some examples, the support structure 44 is defined by a plurality of vertical rails that extend upwardly from each corner of the generally rectangular platform 30. The support structure 44 includes a first set of vertical rails 48 and a second set of vertical rails 50 positioned on opposite sides of the platform 30. The first set of vertical rails 48 includes a first rail 48A and a second rail 48B positioned on a first end 52 of the platform 30. Like the first set of vertical rails 48, the second set of vertical rails 50 also includes a first rail 50A and a second rail 50B positioned on a second end 54 of the platform 30 opposite the first end 52. In some examples, each of the vertical rails 48A, 48B, 50A, 50B are mounted to and extend upwardly away from an outer perimeter of the platform 30. The sets of vertical rails 48, 50 can extend approximately perpendicular (e.g., +/−15 degrees) to a top, operator-supporting surface 55 of the platform 40. As explained in additional detail below, the vertical rails 50A, 50B can have a discontinuous structure formed of a stationary rail 51 and a rotatable rail 53 that is selectively movable between a position approximately parallel and coaxial with the stationary rail 51 (in the deployed position shown in FIG. 3A) and a position nonparallel with the stationary rail 51 (in the stowed position shown in FIG. 3B).

Additional supporting members can be coupled to the support structure 44 to fortify the support structure 44. For example, brace members 56 can extend between the first rails 48A, 50A and between the second rails 48B, 50B of the sets of vertical rails 48, 50, respectively. Floor panels 58 spanning between and coupled to each adjacent vertical rail 48A, 48B, 50A, 50B can be used to further strengthen the support structure 44. The floor panels 58 extend upwardly away from each side of the platform 30, and can create a box-like support structure for the vertical rails 48, 50 that helps maintain the vertical rails in a perpendicular orientation relative to the operator-supporting surface 55 of the platform 30. In some examples, one of the floor panels 58 is formed as a gate 60 that selectively permits access into and out of the passenger compartment 42. The gate 60 can be positioned near the first end 52 of the platform 30 and can be hingedly mounted to one of the vertical rails 48A, 48B within the first set of vertical rails 48.

Figure 4:
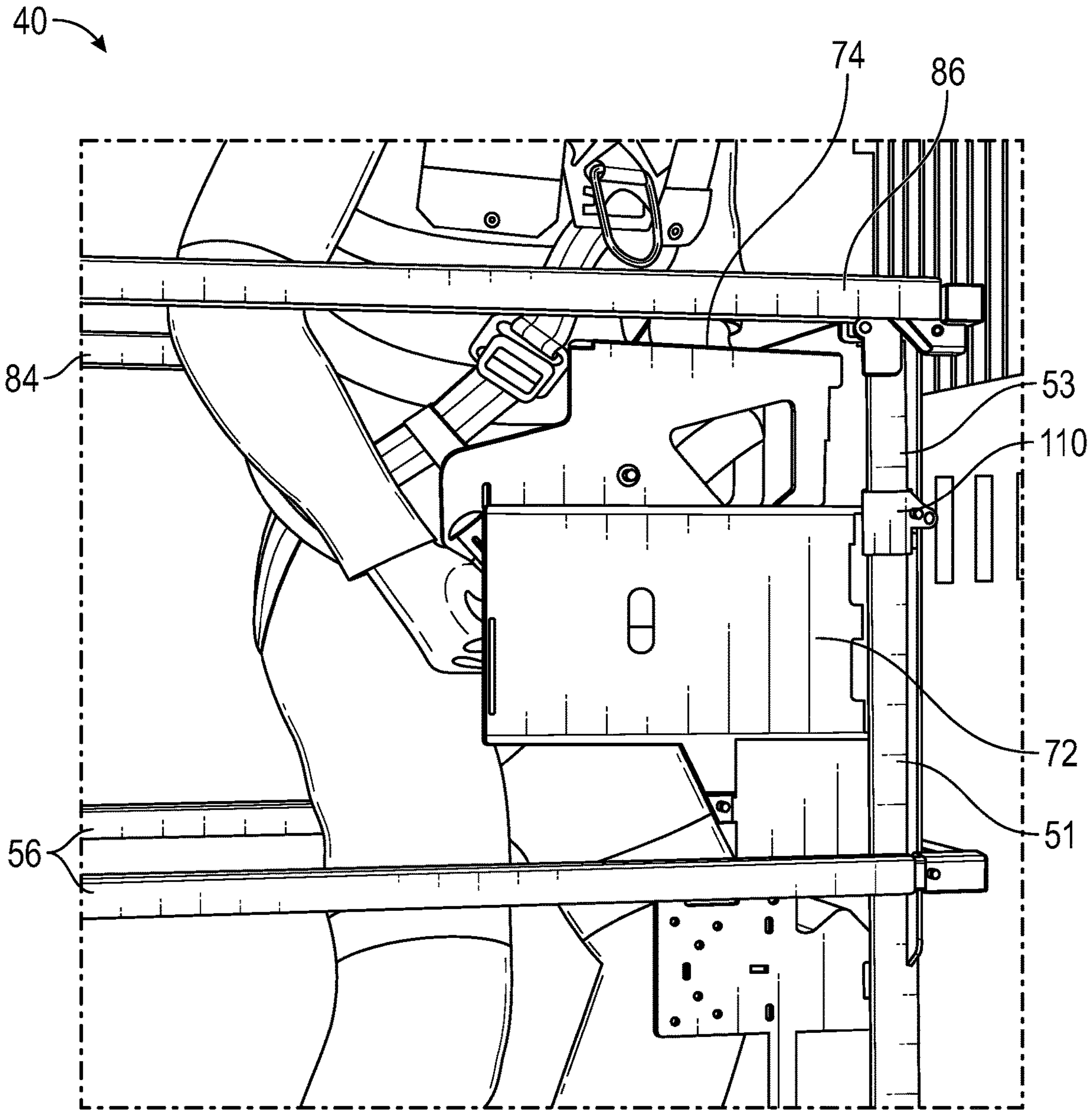
FIG. 4 is a perspective view of a control panel of the scissor lift of FIG. 1 being removed from the foldable rail assembly of FIG. 3A.

The support structure 44 can be further defined by a series of guard plates 62, 64, 66 and additional guard rails 68, 70 positioned opposite the gate 60. The guard rails 68, 70 extend upwardly away from the second end 54 of the platform 30, and can be rigidly coupled to the outer perimeter of the platform 30. A first guard plate 62 is coupled to and positioned outside the guard rails 68, 70, beyond the second end 54 of the platform 30. The second guard plate 64 is coupled to the guard rails 68, 70 as well, but is positioned inside the guard rails 68, 70 and within the passenger compartment 42. The second guard plate 64 can be defined by both a height and a width that is larger than the first guard plate 62, and is positioned above the first guard plate 62. The third guard plate 66 is positioned above the second guard plate 64 and can be selectively coupled to the second guard plate 64, as explained below. The third guard plate 66 can be coupled to the rotatable rails 53 of the vertical rails 50A, 50B. In some examples, and as shown in FIGS. 3A-4, a control panel support plate 72 and control panel 74 are mounted to the support structure 44, adjacent the second guard plate 64. The control panel support plate 72 can be mounted to and suspended away from one of the vertical rails 50A, 50B. The control panel 74 can include a lip 76 that is arranged to rest upon and releasably engage an upper surface 78 of the control panel support plate 72.

The rectangular rail structure 46 is positioned atop the support structure 44, and is movable between a first, deployed position (shown in FIG. 3A) to a second, stowed position (shown in FIG. 3B) to reduce the overall height of the MEWP 20 for transport. The rectangular rail structure 46 generally includes first and second cross rails 80, 82 extending between the vertical rails 48A, 48B, 50A, 50B. The cross rails 80, 82 extend generally parallel (e.g., +/−15 degrees) to the first and second ends 52, 54 of the platform 30. First and second longitudinal rails 84, 86 extend between the cross rails 80, 82, and span between the first set of vertical rails 48 and the second set of vertical rails 50. The longitudinal rails 84, 86 extend approximately parallel to a longitudinal axis X-X of the platform 30. In some embodiments, the longitudinal rails 84, 86 are formed of two telescoping rails 84A, 84B, 86A, 86B that are slidably coupled to one another and movable depending on the position of the rectangular rail structure 46 relative to the support structure 44. The cross rails 80, 82 and longitudinal rails 84, 86 collectively define an uppermost surface 88 of the rectangular rail structure 46.

The rectangular rail structure 46 is coupled to the support structure 44 using a series of rotary latches 90, 92, 94, 96 depicted in FIGS. 5A-6E. The rotary latches 90, 92, 94, 96 allow the rectangular rail structure 46 to fold relative to the support structure 44. Slam latches 90, 92 are positioned between the vertical rails 48A, 48B of the support structure 44 and the longitudinal rails 84, 86. The slam latches 90, 92 each include a body portion 100 and a trigger mechanism 102 that selectively engage one another to lock the rectangular rail structure 46 into position relative to the support structure 44. On the opposite side of the foldable rail assembly 40, draw latches 94, 96 mounted on the second guard plate 64 selectively engage paws 104, 106 mounted to the third guard plate 66. When the draw latches 94, 96 engage the paws 104, 106, relative rotation between the third guard plate 66 and second guard plate 64 is restricted. The second guard plate 64 and third guard plate 66 are secured in an approximately parallel relationship, and the rotatable sections 53 of the vertical rails 50A, 50B are unable to rotate about the hinges 108, 110 that couple the stationary sections 51 of the vertical rails 50A, 50B to the rotatable sections 53 of the vertical rails 50A, 50B.

As shown in FIGS. 5A-5E, the body portion 100 of each slam latch 90, 92 is rotatably mounted to a distal end of the vertical rails 48A, 48B using a first pin 98 and rotatably mounted to an underside of the rectangular support structure 46 (e.g., to one of the longitudinal rails 84, 86) using a second pin 99 positioned opposite the first pin 98. The body portion 100 is defined by a generally arcuate profile formed of parallel plates 112, 114 straddling one of the vertical rails 48A, 48B. The parallel plates 112, 114 have a geometry that is complimentary to the trigger mechanism 102, and include a stowed engagement surface 116, a first shoulder 118, a second shoulder 120 positioned away from the first shoulder 118, and a protrusion 122 extending outwardly between the first shoulder 118 and the second shoulder 120. The protrusion 122 includes a striker 124 in the form of a pin that is rigidly coupled (e.g., welded) to each of the plates 112, 114, and can be selectively engaged by the paw 126 of the trigger mechanism 102.

Figure 5A:
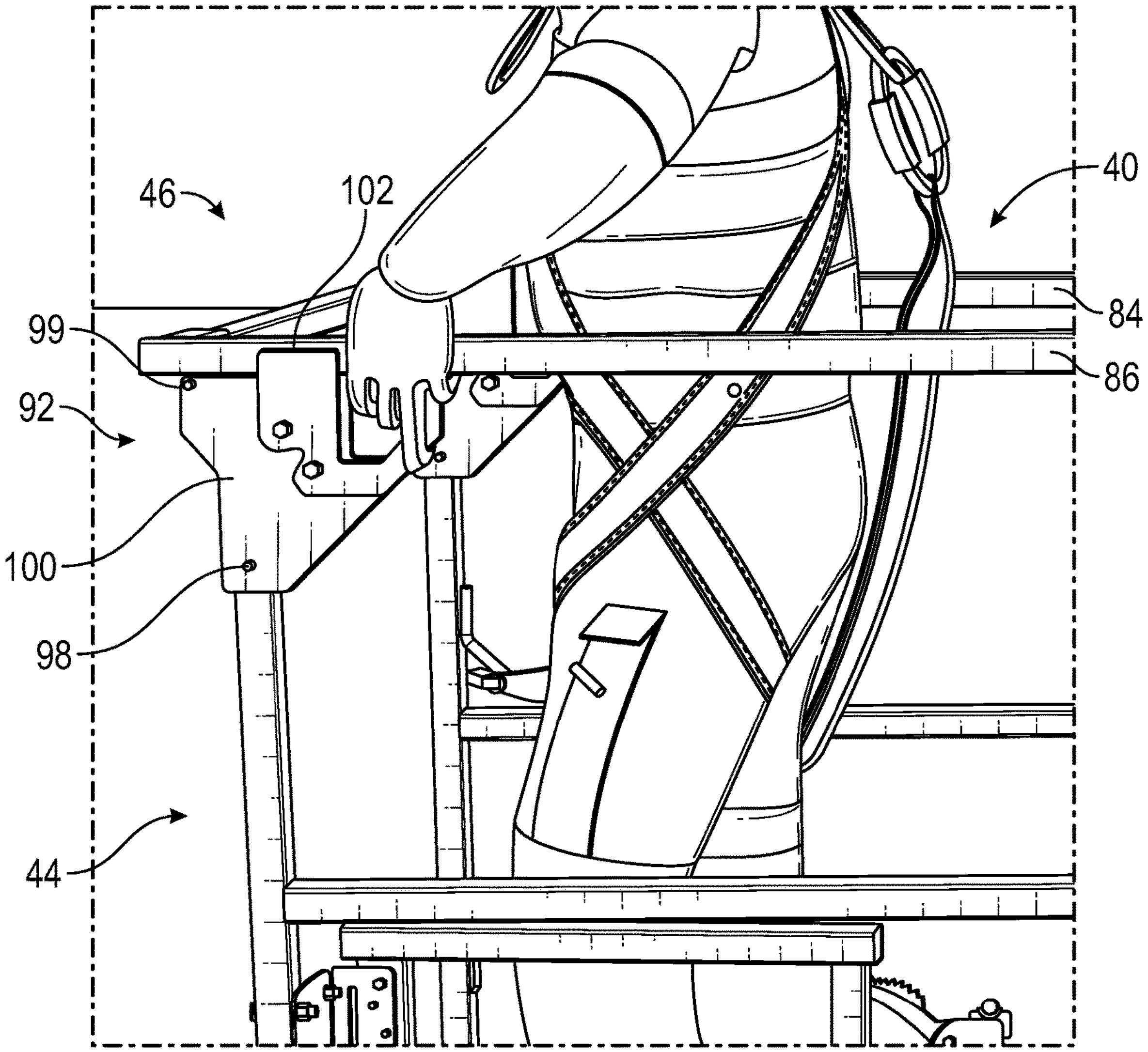
FIGS. 5A-5E are perspective views of slam latches that are present within the foldable rail assembly of FIG. 3A, in various states of being locked and unlocked.
Figure 5B:
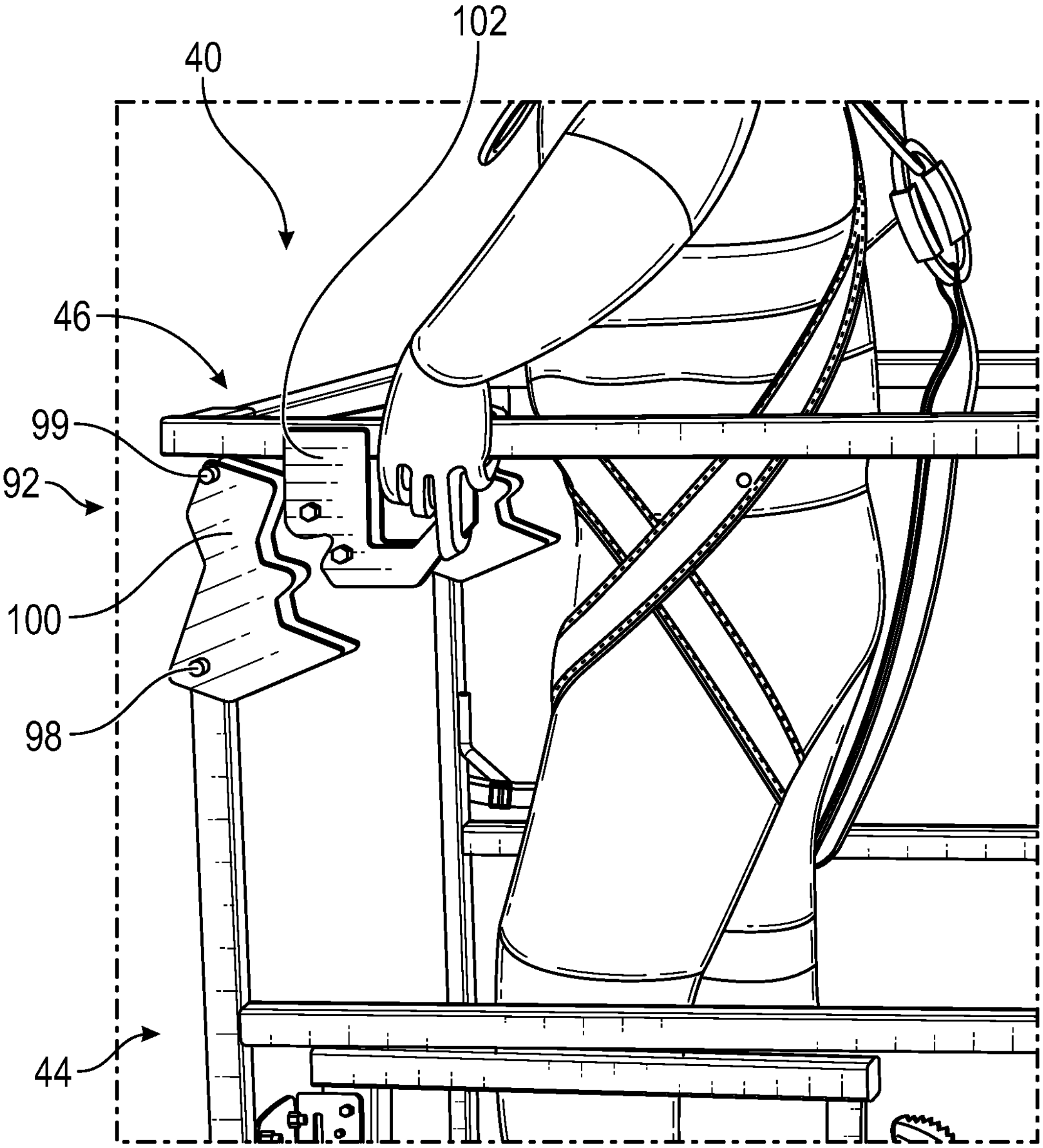
Figure 5C:
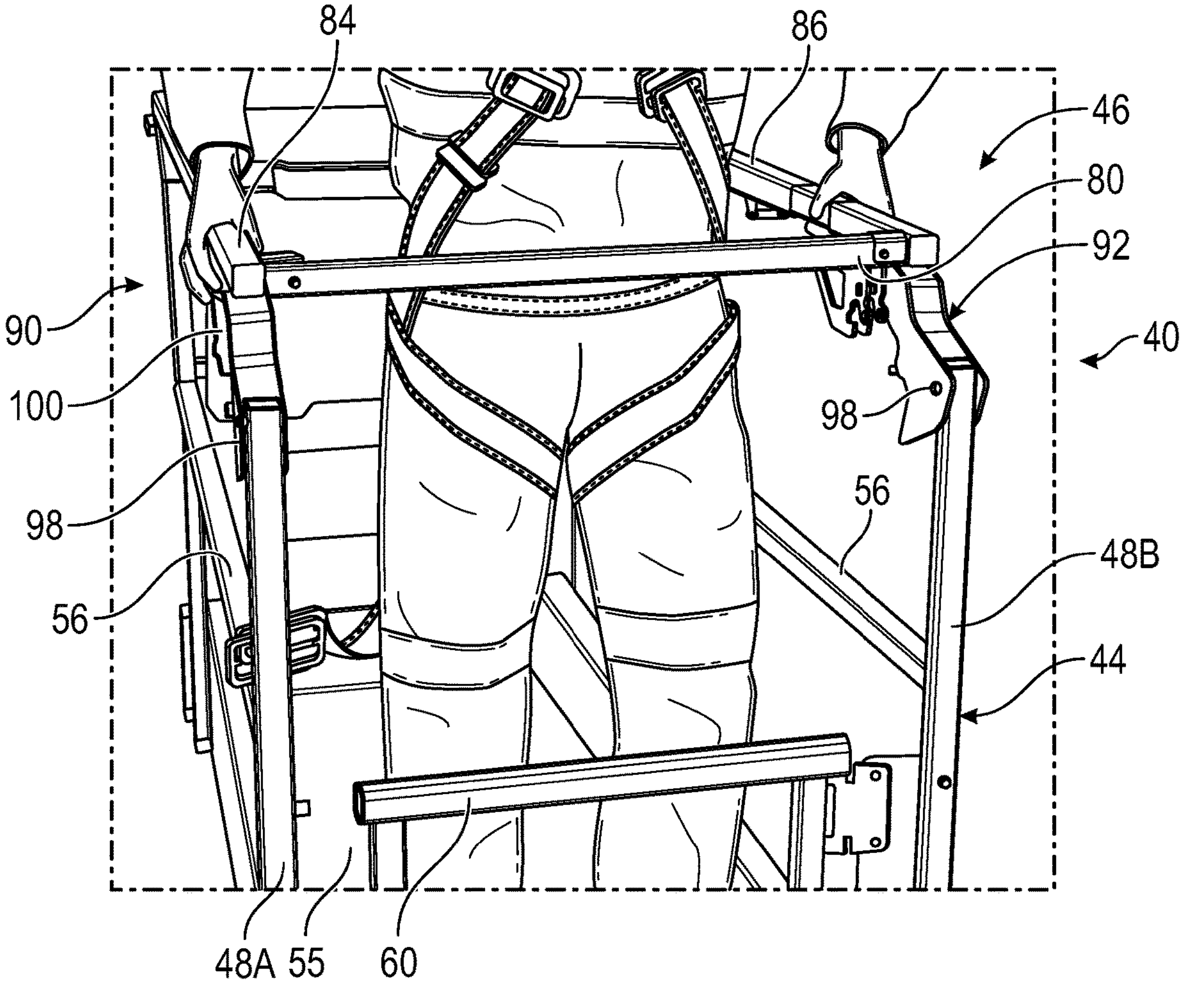
Figure 5E:
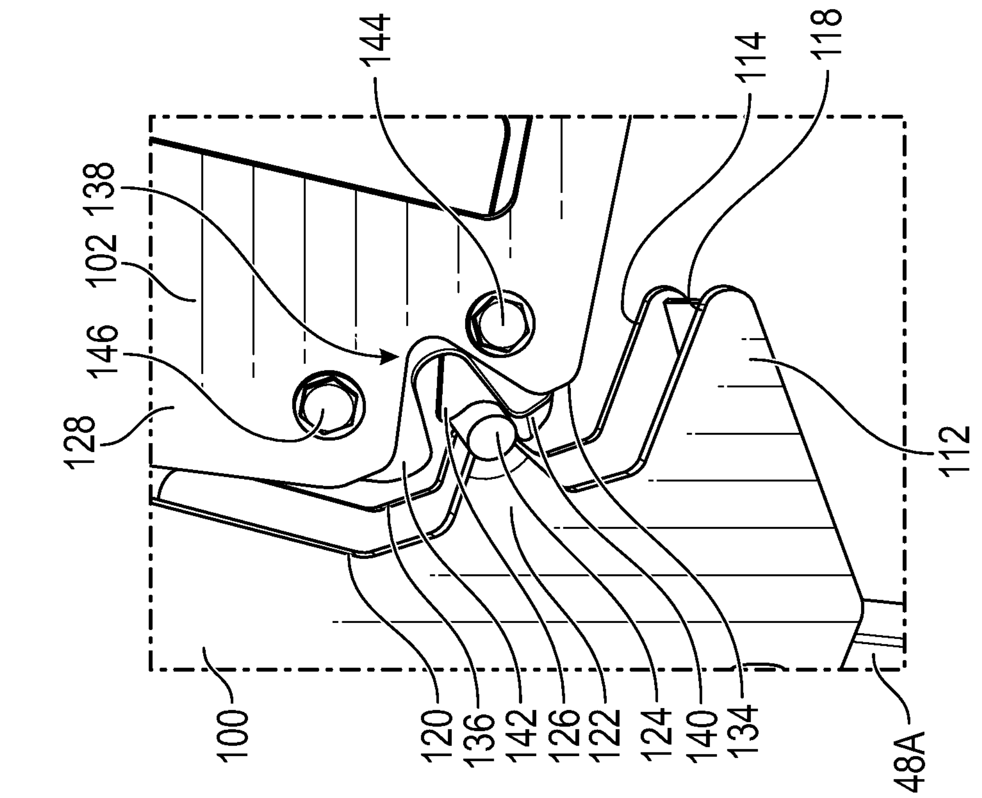
Figure 5D:
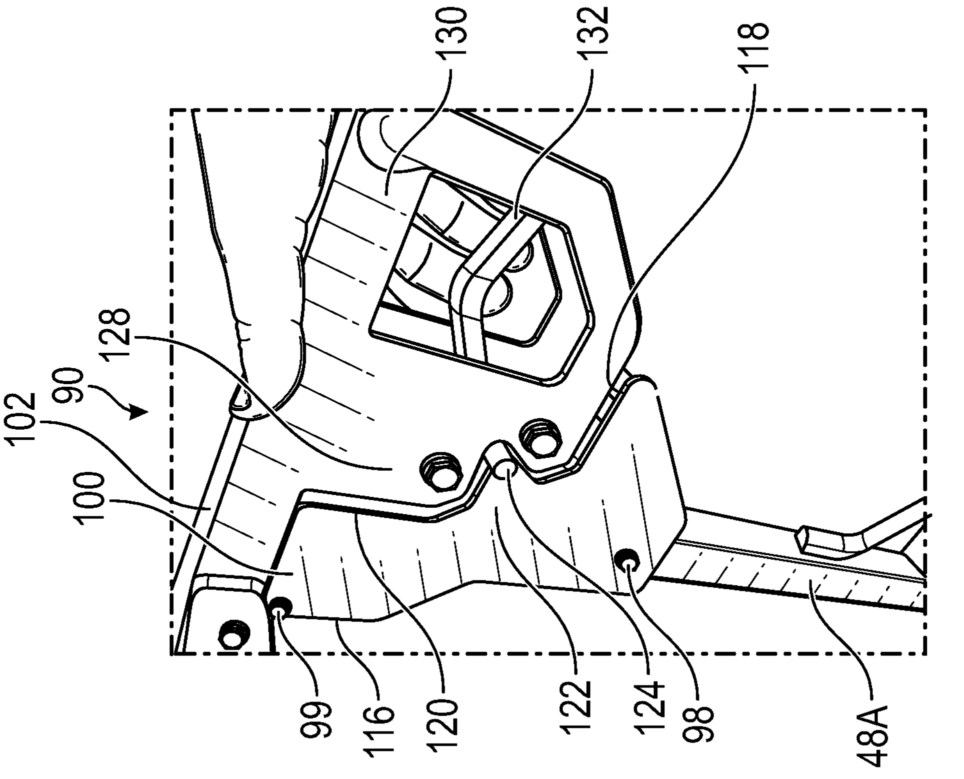

The trigger mechanisms 102 are rigidly coupled (e.g., welded) to the underside of the longitudinal rails 84, 86 and can selectively engage the body portions 100 to form a releasable coupling. The trigger mechanisms 102, like the body portions 100, can be formed of a parallel plate construction. The trigger mechanisms 102 generally include an engaging portion 128 and a trigger guard 130 positioned rearward of the engaging portion 128 and surrounding a lever-like actuator 132. The engaging portion 128 is defined by a profile complimentary to the parallel plates 112, 114 of the body portions 100, and includes an undulating face including two protruding surfaces 134, 136 on opposite sides of a locking recess 138. A locking mechanism 140 is positioned within the locking recess 138, and is arranged to releasably engage the striker 124 of the body portion 100 to secure the trigger mechanism 102 to the body portion 100. As shown in FIG. 5E, the locking mechanism 140 can include a locking insert 142 mounted in place within the locking recess using pins 144, 146 extending through the engaging portion 128 of the trigger mechanism 102. A paw 126 of the trigger mechanism 102 is selectively rotatable relative to the locking insert 142 about the pin 144 using the actuator 132. When the actuator 132 is not engaged, the paw 126 remains in an "engaged position," and protrudes outward beyond the locking insert 142 and into the locking recess 138, so that the paw 126 can engage the striker 124. In some examples, the actuator 132 is biased (e.g., using a spring) toward the disengaged position (and the paw 126 is simultaneously biased toward the engaged position). The paw 126 can be rotated from the protruding position (shown in FIG. 5E) to a retracted or "disengaged position" (shown in FIG. 5C) by engaging and rotating the actuator 132 (e.g., with the hands of a user). In the retracted position, the paw 126 rotates inward from the locking insert 142 and disengages the striker 124, such that relative motion between the trigger mechanism 102 (and rectangular rail structure 46) and the body portion 100 (and support structure 44) can occur to transition the foldable rail assembly 40 from the first position to the second position.

As shown in FIGS. 6A-6E, the draw latches 94, 96 positioned on the opposite side of the foldable rail assembly 40 are also movable between locked (shown in FIG. 6A) and unlocked (shown in FIG. 6B) positions to allow relative rotation between the third guard plate 66 and second guard plate 64 about the hinges 108, 110. Each draw latch 94, 96 includes an arm 150 and a lever 152 that cooperate to selectively engage the paws 104, 106 mounted to the third guard plate 66. The arms 150 extend upwardly away from a camshaft 154 that is rotatably supported by a latch body 156. A hook 158 formed at a distal end of the arm 150 can be selectively engaged with the paws 104, 106, which have an obliquely-extending section extending away from the third guard plate 66. In the unlocked position, the arm 150 can extend upward to a position above the paws 104, 106, so that the hook 158 can extend around a portion of the paw 104, 106. Upward rotation of the lever 152 rotates the camshaft 154 relative to the latch body 156, which pulls the arm 150 downward, toward the latch body 156. The downward motion of the arm 150 secures the hook 158 around the paw 104, 106 and creates a coupling between the second guard plate 64 and the third guard plate 66.

With reference now to FIGS. 2-9, the transitioning process of the foldable rail assembly 40 between the first, deployed position and the second, stowed (or folded) position is described in additional detail. In the first, deployed position shown in FIG. 2, the latches 90, 92, 94, 96 are each locked. The body portions 100 of each slam latch 90, 92 are engaged by the trigger mechanisms 102, and the paws 126 of each trigger mechanism 102 engage and secure the strikers 124 within the locking recesses 138. The hooks 158 on the arms 150 of the draw latches 94, 96 are each engaged with the paws 104, 106, which secures the second guard plate 64 and third guard plate 66 in an approximately (e.g., within 15 degrees) parallel relationship. As further detailed in FIG. 3A, the rotatable sections 53 and the stationary sections 51 are arranged in a parallel and approximately coaxial relationship. Accordingly, the rectangular rail structure 46 is approximately aligned with the outer perimeter of the platform 30 of the MEWP 20.

To begin transitioning the foldable rail assembly 40 to the second, stowed position, the control panel 74 is first removed from the control panel support plate 72, as depicted in FIG. 4. The control panel 74 can be lifted so that the lip 76 of the support plate is raised away from the upper surface 78 of the control panel support plate 72. The control panel 74 can then be set aside (e.g., upon the operator supporting surface 55 of the platform 40) while the MEWP 20 is being transported.

Figure 6A:
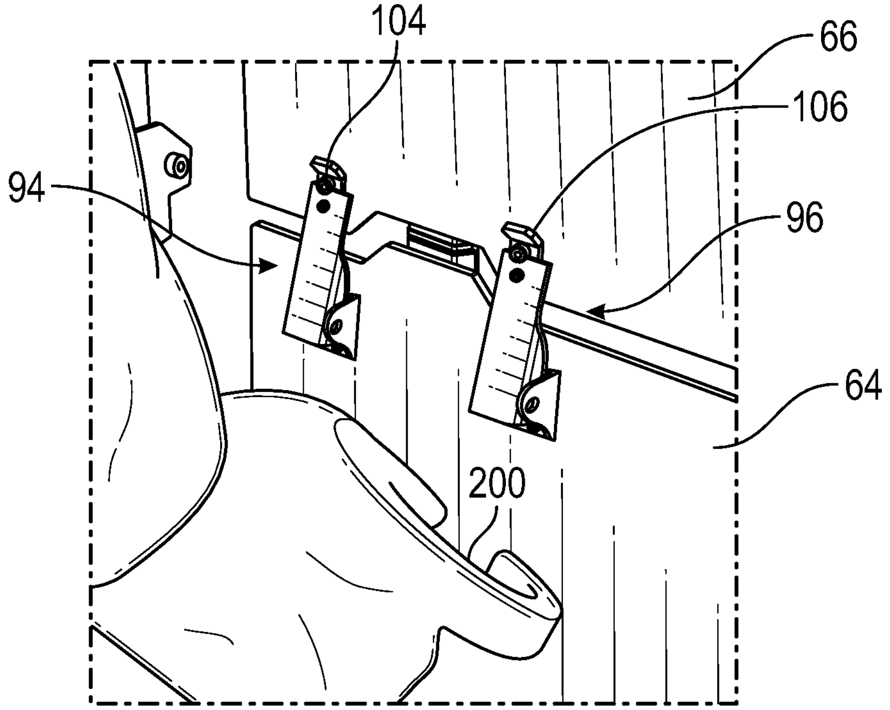
FIGS. 6A-6E are perspective views of draw latches that are present within the foldable rail assembly of FIG. 3A, in various states of being locked and unlocked.
Figure 6B:
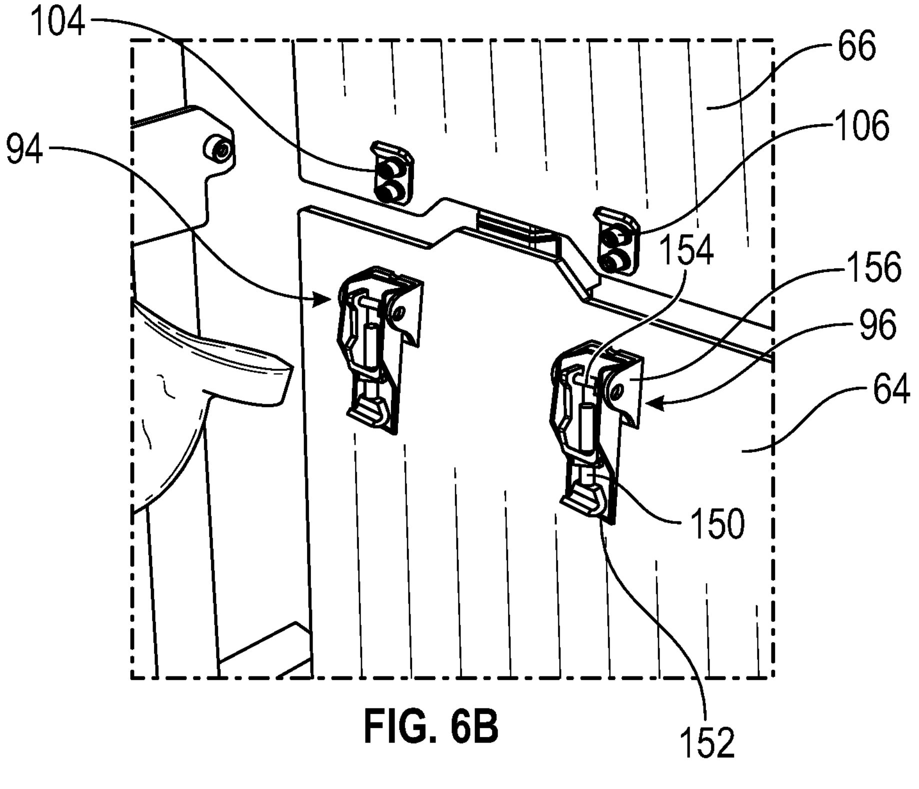
Figure 6E:
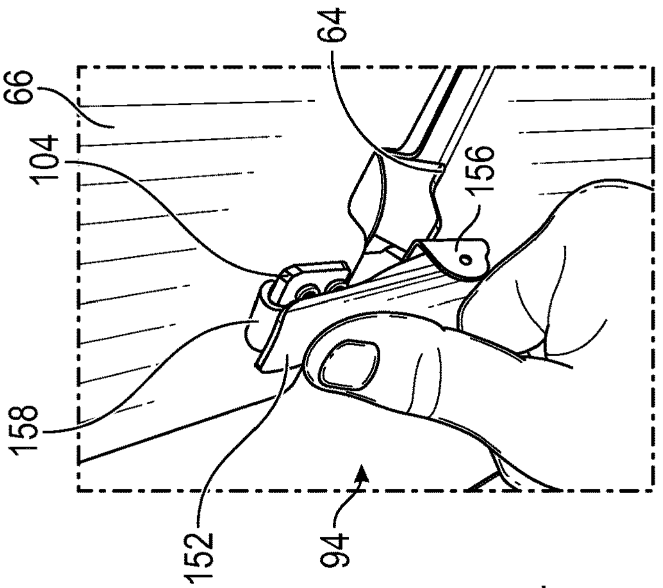
Figure 6D:
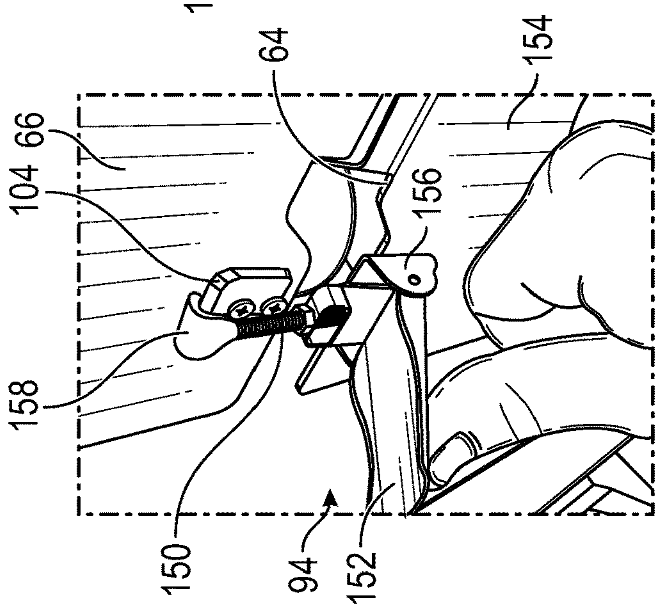
Figure 6C:
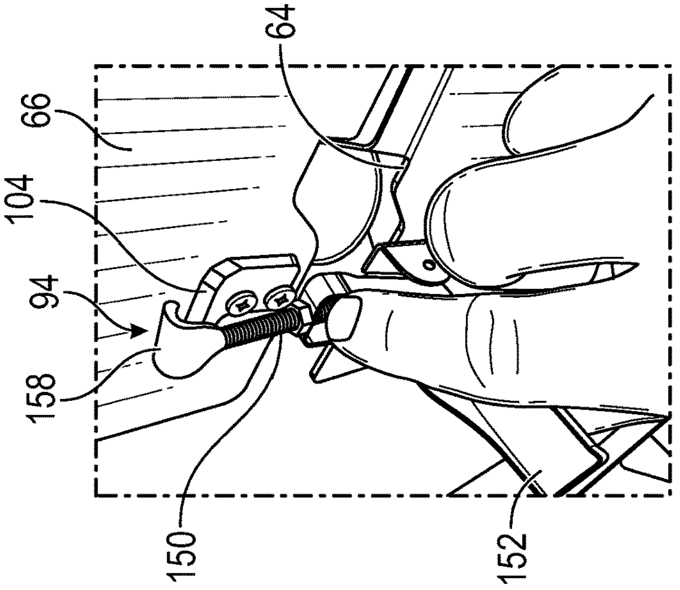

Once the control panel 74 is removed from the control panel support plate 72, the draw latches 94, 96 can be unlocked. As depicted in FIGS. 6A-6B, an operator (with or without the use of a tool 200) can rotate the levers 152 of each draw latch 94, 96 downward, toward the second guard plate 64. The downward rotation of the lever 152 rotates the cam shaft 156 and releases the tension on the hook 158. The hooks 158 and arms 150, more generally, can then be disengaged from the claws 104, 106. Disengagement of the draw latches 94, 96 allows relative motion between the third guard plate 66 and the second guard plate 64 by permitting the rotatable sections 53 of the vertical rails 50A, 50B to rotate about the hinges 108, 110, relative to the stationary sections 51 of the vertical rails 50A, 50B.

With the draw latches 94, 96 unlocked and released, relative rotation and movement between the rectangular rail structure 46 and support structure 44 is still blocked by the slam latches 90, 92. To unlock the slam latches 90, 92, an operator can reach a hand into the trigger guard 130 of each slam latch 90, 92 to engage and rotate the actuator 132 positioned within the trigger guard 130. Upward rotation of the actuator 132, as shown in FIG. 5A, causes downward rotation of the paw 126 about the pin 144, and disengages the paw 126 from the striker 124 of the body portion 100 of each slam latch 90, 92.

With the trigger mechanism 102 unlocked from the body portion 100 of each slam latch 90, 92, the rectangular rail structure 46 is movable relative to the support structure 44. The operator can urge the rectangular rail structure 46 backward, toward and into the passenger compartment 42 of the foldable rail assembly 40, as shown in FIG. 5B. Rearward motion of the rectangular rail structure 46 begins transitioning the foldable rail assembly 40 toward the second, stowed position.

As demonstrated in FIGS. 5C, 7A-7C, and 8, the rearward movement of the rectangular rail structure 46 causes rotation within or about each vertical rail 48A, 48B, 50A, 50B, which in turn lowers the height of the uppermost surface 88 of the rectangular rail structure 46. When the trigger mechanisms 102 are pulled away from the body portions 100, the body portion 100 rotates about each of the first pin 98 and the second pin 99 used to mount the body portions 100 to the vertical rails 48A, 48B and rectangular rail structure 46, respectively. Because the body portions 100 are shaped to have a greater height than width, rotation of the body portions 100 about each of the pins 98, 99 reduces the height of the support that the rectangular rail structure 46 rests on. As demonstrated in FIGS. 3B and 8, the body portions 100 each rotate approximately 90 degrees about the vertical rails 48A, 48B to arrive at the stowed position.

Figure 7A:
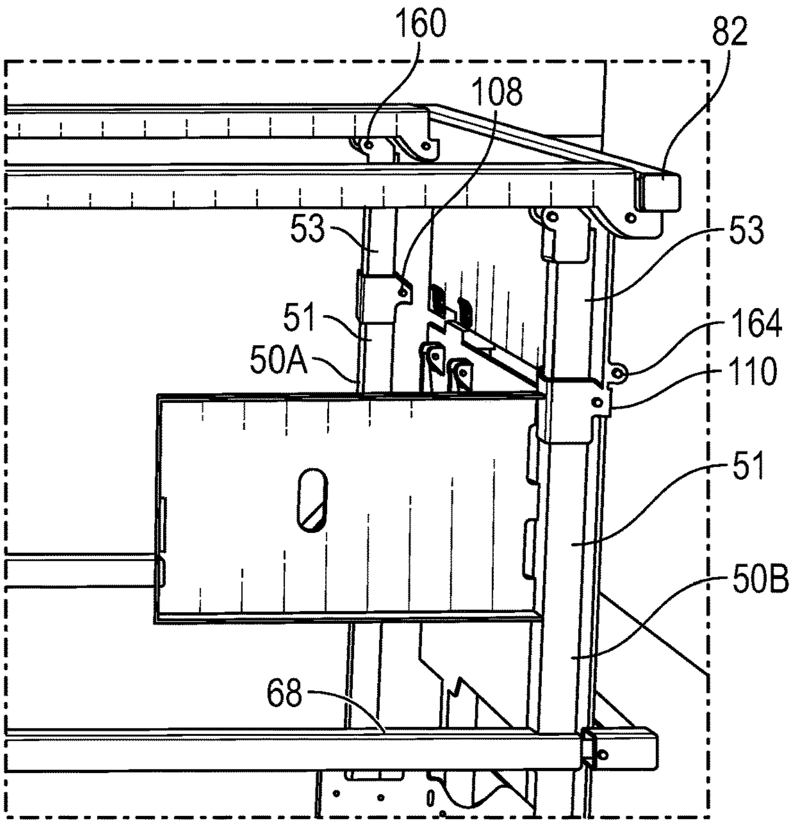
FIGS. 7A-7C are perspective views of a portion of the foldable rail assembly of FIG. 3A transitioning between the first position and the second position.
Figure 7B:
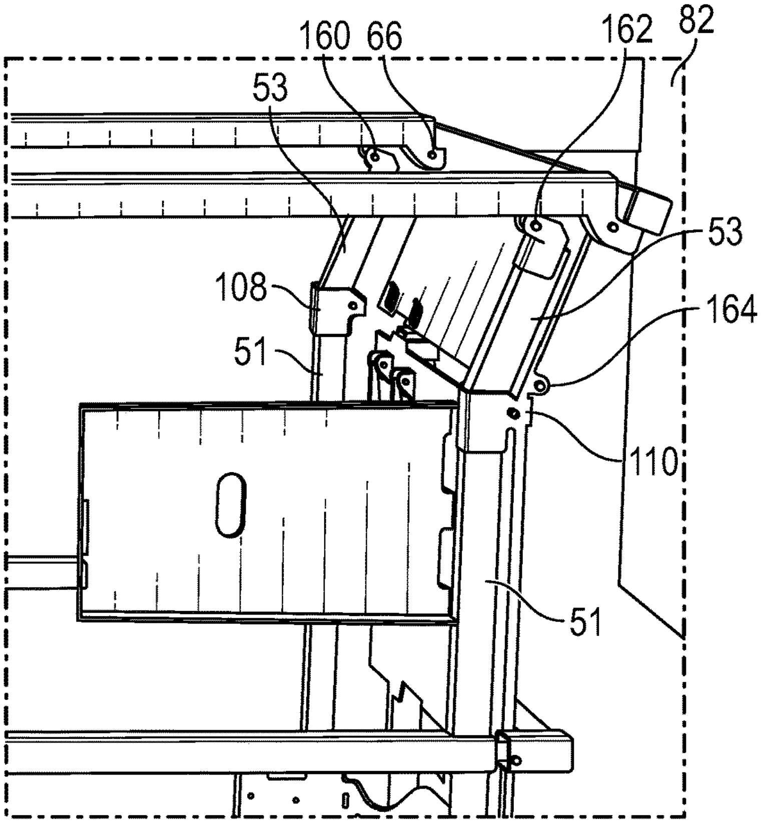
Figure 7C:
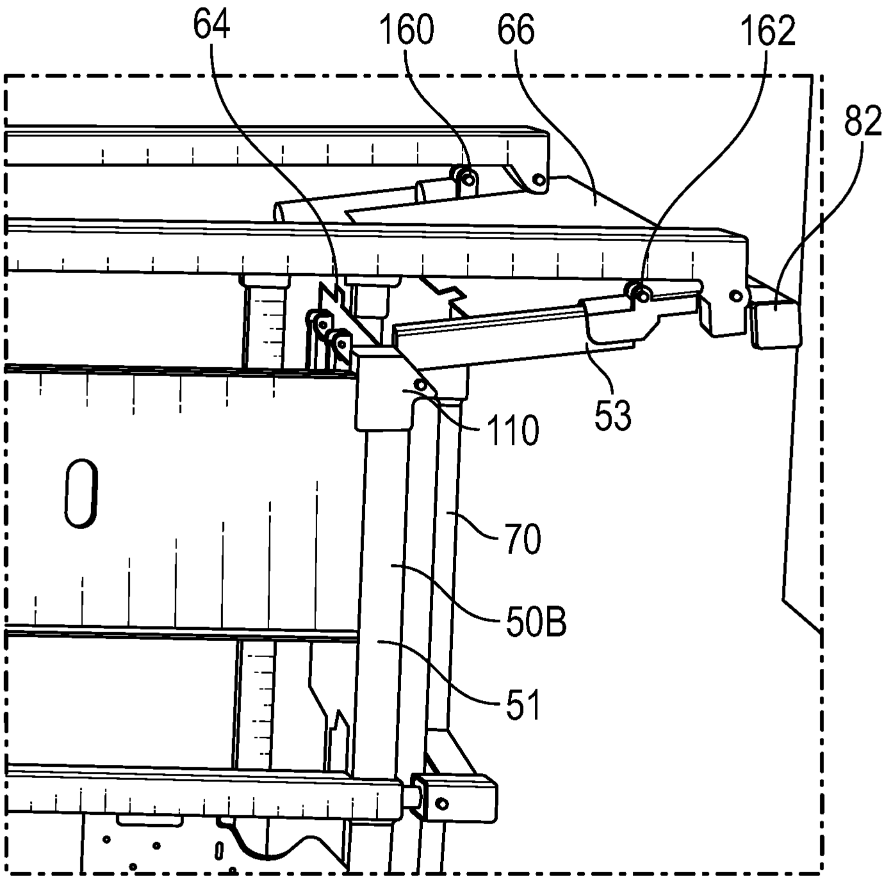

Rearward movement of the rectangular rail structure 46 also causes rotation of the vertical rails 50A, 50B opposite the slam latches 90, 92, as shown in FIGS. 7A-7C. With the draw latches 94, 96 unlocked and disengaged from the paws 104, 106, rotatable sections 53 of the vertical rails 50A, 50B are freely rotatable about the hinges 108, 110. Urging the rectangular rail structure 46 backward causes subsequent rotation of the rotatable sections 53 of each vertical rail 50A, 50B, the third guard plate 66, and the rear cross rail 82 to each rotate around the hinges 108, 110. In some examples, additional hinges 164, 166 are positioned between the second guard plate 64 and third guard plate 66 (e.g., on guard rails 68, 70) to further support the rotational motion therebetween. Pivot pins 160, 162 extending through each of the longitudinal rails 84, 86 and the rear cross rail 82 create an additional rotatable coupling that allows the rear cross rail 82 and third guard plate 66 to rotate relative to the platform 30 and relative to the vertical rails 50A, 50B. By rotating the rotatable sections 53 of the vertical rails 50A, 50B out of alignment with the stationary sections 51 of the vertical rails, the total height of the vertical rails 50A, 50B is reduced, which subsequently lowers the overall height of the foldable rail assembly 40.

Figure 8:
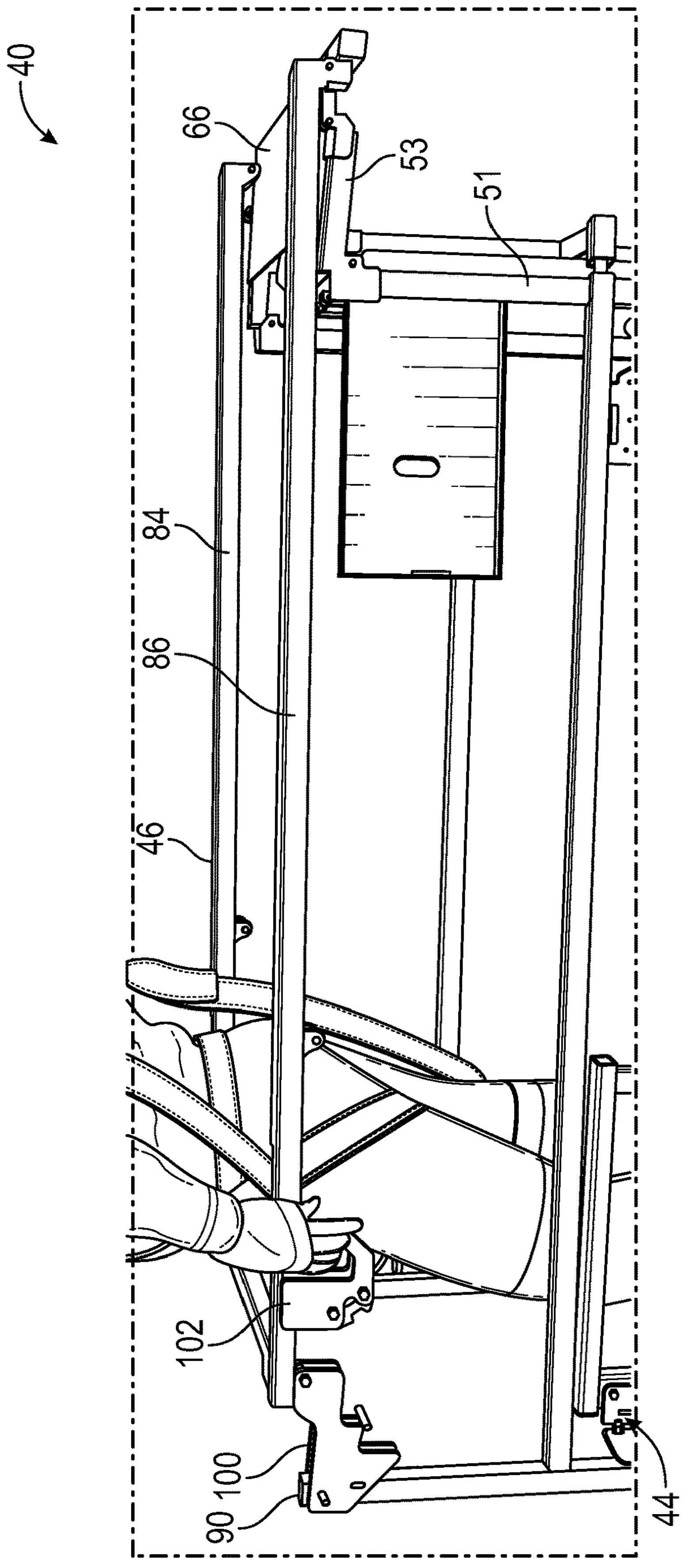
FIG. 8 is a perspective view of the foldable rail assembly of FIG. 3A fully transitioned to the second position.
Figure 9:
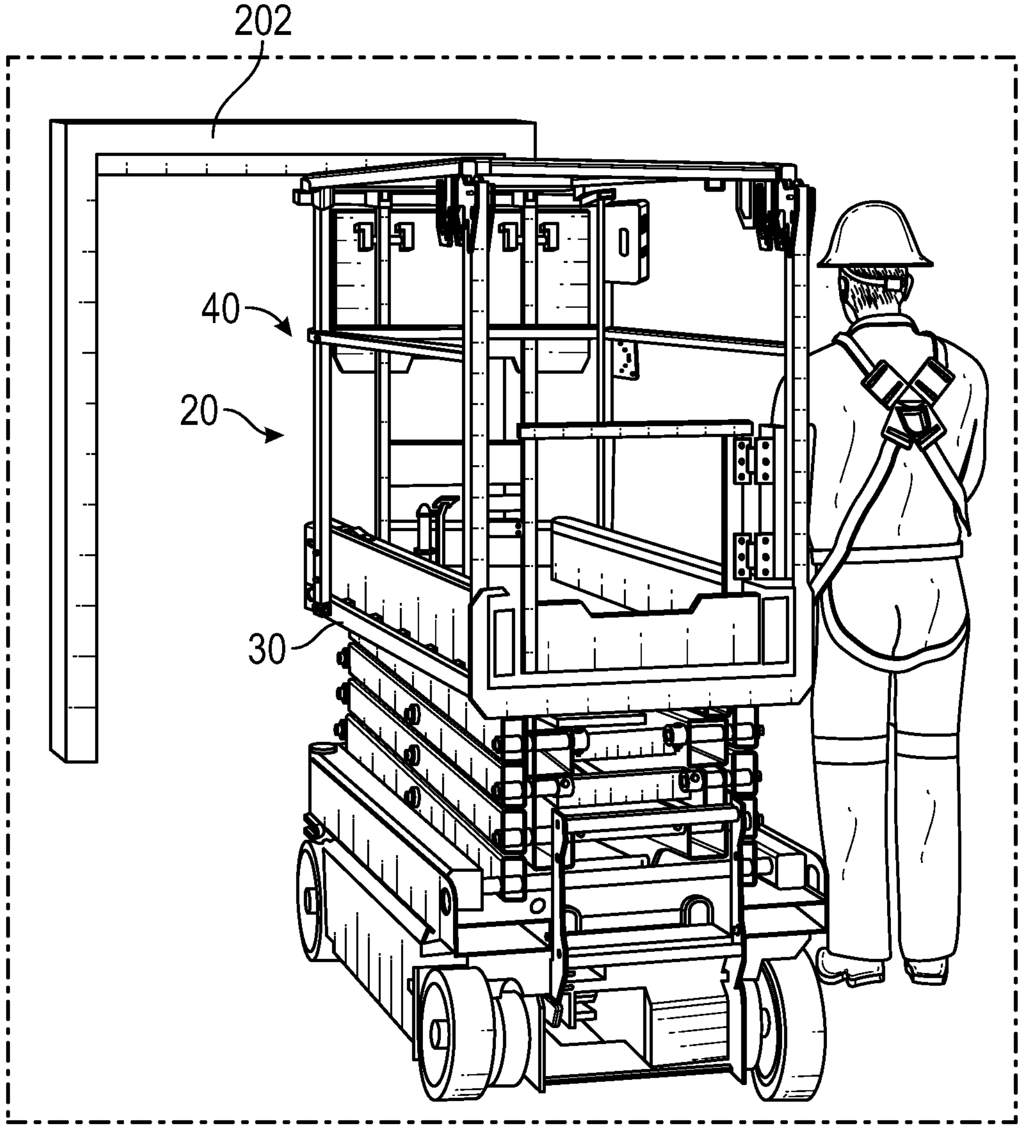
FIG. 9 is a perspective view of the scissor lift of FIG. 1, shown approaching the standard doorway of FIG. 2 in a configuration shorter than the height of the standard doorway.

As depicted in FIGS. 3B and 8, the rectangular rail structure 46 can be urged backwardly away from the first set of vertical rails 48 until the body portions 100 of each slam latch 90, 92 and the rotatable sections 53 of each vertical rail 50A, 50B have rotated approximately 90 degrees. The rotation of the body portions 100 and rotatable sections 53 of each vertical rail 50A, 50B causes the longitudinal rails 84, 86 to travel in an arcuate path rearward and downward, until an uppermost surface 88 of the rectangular rail section 46 is positioned closer to the platform 40 than when the foldable rail assembly 40 is in the first, deployed position. As depicted in FIG. 3B, the stowed engagement surface 116 of the body portion 100 can support the underside of the longitudinal rails 84, 86 in the stowed position. The rectangular rail structure 46 is offset from the perimeter of the platform 30, and the overall height of the foldable rail assembly 40 is reduced by an amount approximately equal to the length of the rotatable sections 53 of the vertical rails 50A, 50B. Each of the rotatable sections 53 extend nonparallel to the stationary sections 51 of the vertical rails 50. While in the first, deployed position shown in FIG. 2, the MEWP 20 is taller than the height of a standard doorway 202, transitioning the foldable rail assembly 40 to the second, stowed position reduces the overall height of the MEWP 20 so that the MEWP 20 can pass through a standard doorway 202 without significant modification, as shown in FIG. 9.

Once the MEWP 20 has been transported to an appropriate location, the foldable rail assembly 40 can be redeployed using the opposite process from what was described above. The rectangular rail structure 46 can be raised upward and pushed forward, outward from the passenger compartment 42, until the body portions 100 and the trigger mechanisms 102 of the slam latches 90, 92 engage one another. Once engaged, the draw latches 94, 96 opposite the slam latches 90, 92 can be re-engaged to the paws 104, 106 to secure the second guard plate 64 and third guard plate 66 in an approximately parallel and approximately vertical orientation. Finally, the control panel 74 can be repositioned onto the control panel support plate 72, so that an operator can control the MEWP 20 from the platform 30.

Although this description may discuss a specific order of method steps, the order of the steps may differ from what is outlined. Also two or more steps may be performed concurrently or with partial concurrence.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A scissor lift platform, comprising:

a rectangular platform base; and a foldable rail assembly coupled to the rectangular platform base and extending upwardly from the rectangular platform base to define a passenger compartment, the foldable rail assembly including:

a support structure including a plurality of vertical rails extending away from the rectangular platform base;

a rectangular rail structure rotatably coupled to the support structure, the rectangular rail structure being movable between (a) a first position in which the rectangular rail structure is aligned with the rectangular platform base and positioned at a first distance away from the rectangular platform base and (b) a second position in which the rectangular rail structure is offset from the rectangular platform base and positioned at a second distance away from the rectangular platform base that is smaller than the first distance; and a plurality of rotary latches positioned between the rectangular rail structure and the vertical rails and configured to transition the foldable rail assembly between the first position and the second position, wherein the rotary latches positioned between the rectangular rail structure and the vertical rails include draw latches and slam latches.

2. The scissor lift platform of claim 1, wherein the slam latches each include a rotatable body coupled to and pivotable relative to the vertical rails, and the rectangular rail structure includes a trigger mechanism releasably coupled to the rotatable body.

3. The scissor lift platform of claim 2, wherein the trigger mechanism includes a paw that is selectively movable between an engaged position and a disengaged position using an actuator.

4. The scissor lift platform of claim 1, wherein the rotary latches each include locking mechanisms configured to secure the foldable rail assembly in the first position.

5. The scissor lift platform of claim 1, wherein each of the slam latches includes a body and a trigger mechanism releasably coupled to the body, the body being coupled to the vertical rails and the trigger mechanism being mounted to the rectangular rail assembly.

6. The scissor lift platform of claim 5, wherein the body includes a protrusion selectively received within a locking recess formed within the trigger mechanism to secure the body to the trigger mechanism.

7. The scissor lift platform of claim 6, wherein a paw extends into the locking recess and is selectively movable relative to the trigger mechanism using an actuator rotatably coupled to the trigger mechanism.

8. The scissor lift platform of claim 5, wherein the trigger mechanism is engaged with the body in the first position, and wherein the trigger mechanism is disengaged from the body in the second position.

9. The scissor lift platform of claim 1, wherein the vertical rails include a first rail and a second rail, wherein the first rail and the second rail are each defined by a discontinuous structure.

10. The scissor lift platform of claim 1, wherein the vertical rails include a first rail assembly and a second rail assembly, wherein the first rail assembly and the second rail assembly each include a stationary rail and a rotatable rail hingedly coupled to the stationary rail.

11. The scissor lift platform of claim 10, wherein the draw latches restrict relative rotation between the rotatable rail and the stationary rail of the first rail assembly and the second rail assembly.

12. The scissor lift platform of claim 10, wherein in the first position, the stationary rail and the rotatable rail of the first rail assembly extend coaxially and wherein in the second position, respective major lengths of the stationary rail and the rotatable rail of the first rail assembly extend nonparallel with one another.

13. The scissor lift platform of claim 10, wherein in the first position, the stationary rail and the rotatable rail of the first rail assembly extend perpendicular to the rectangular rail structure, and wherein in the second position, the rotatable rail of the first rail assembly extends approximately parallel to the rectangular rail structure.

14. The scissor lift platform of claim 1, wherein the draw latches each have a locked configuration and an unlocked configuration, and wherein in the first position the draw latches are in the locked configuration and in the second position the draw latches are in the unlocked configuration.

15. The scissor lift platform of claim 1, wherein each of the draw latches include:

a draw latch body indirectly coupled to the vertical rails;

a camshaft rotatably supported by the draw latch body; and a draw latch arm that extends away from the camshaft and includes a hook at a distal end of the draw latch arm.

16. The scissor lift platform of claim 15, wherein the hook is configured to selectively engage a paw coupled to the rectangular rail assembly.

17. The scissor lift platform of claim 16, wherein the draw latches each have a locked configuration and an unlocked configuration, wherein in the unlocked configuration the draw latch arm has a first length, and wherein in the locked configuration the draw latch arm has a second length less than the first length.

* * * * *